US007670123B2

United States Patent
Cuny et al.

(10) Patent No.: US 7,670,123 B2
(45) Date of Patent: Mar. 2, 2010

(54) TIRE TREAD WEAR INDICATOR MOLDING DEVICE FOR FORMING A TREAD WEAR INDICATOR

(75) Inventors: Andre Cuny, Hababy-la-Neuve (BE); Frank Severens, Arlon (BE); Anne-France Gabrielle Jeanne-Marie Cambron, Angelsberg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 484 days.

(21) Appl. No.: 11/717,431

(22) Filed: Mar. 13, 2007

(65) Prior Publication Data

US 2007/0163691 A1    Jul. 19, 2007

Related U.S. Application Data

(62) Division of application No. 10/924,004, filed on Aug. 23, 2004, now abandoned.

(51) Int. Cl.
*B29C 33/42* (2006.01)
*B60C 11/24* (2006.01)

(52) U.S. Cl. .................. 425/28.1; 425/46; 425/169

(58) Field of Classification Search .............. 425/28.1, 425/35, 46, 169; 249/53 R
See application file for complete search history.

(56) References Cited

U.S. PATENT DOCUMENTS

| | | | |
|---|---|---|---|
| 2,706,509 A | 4/1955 | White | 152/209 |
| 3,653,432 A | 4/1972 | French | 152/209 R |
| 3,739,828 A * | 6/1973 | Schaevitz | 152/209.22 |
| 4,154,564 A * | 5/1979 | French | 425/28.1 |
| RE30,518 E * | 2/1981 | French | 152/154.2 |
| 5,964,118 A * | 10/1999 | Kamata | 72/286 |
| 6,193,492 B1 * | 2/2001 | Lagnier et al. | 425/28.1 |
| 6,523,586 B1 | 2/2003 | Eromäki et al. | 152/154.2 |
| 2002/0036039 A1 | 3/2002 | Shimura | 152/154.2 |
| 2005/0269003 A1* | 12/2005 | Fujii et al. | 152/154.2 |

FOREIGN PATENT DOCUMENTS

| | | |
|---|---|---|
| DE | 36 27 832 A1 | 2/1988 |
| EP | 250113 | 12/1987 |
| SU | 408833 * | 7/1974 |
| WO | WO 2004/050390 A1 | 6/2004 |

* cited by examiner

*Primary Examiner*—James Mackey
(74) *Attorney, Agent, or Firm*—Richard B. O'Planick

(57) ABSTRACT

A tire has at least one tread wear indicator. Each wear indicator is a single mark that provides continuous information to the consumer, while changing its presentation based upon the amount of tread wear. The mold blade employed to form the ear indicator has a series of stacked portions, each portion having a different configuration, the configuration being constant for the length of each portion.

5 Claims, 4 Drawing Sheets

TIRE TREAD WEAR INDICATOR MOLDING DEVICE FOR FORMING A TREAD WEAR INDICATOR

This is a Divisional of U.S. patent application Ser. No. 10/924,004, filed Aug. 23, 2004, now abandoned.

FIELD OF THE INVENTION

The present invention is directed towards a tire. More specifically, the invention is directed to a wear indicator for the tread of a tire. Also disclosed is a molding device for forming the wear indicator.

BACKGROUND OF THE INVENTION

The use of treadwear indicators is not new and the use of treadwear indicators is mandated by law in many countries. A variety of such indicators are known. Once such type employs colored means, such as colored rubber or colored fibers, below the tread for a visual indicator of wear. Other types use tie-bar type elements in the tread grooves. When required by law, the upper surface of the tread wear indicator must be located at a height of 1.6 mm from the base of the groove in which the wear indicator is located.

The practical problem with the colored indicators of the type mentioned is that there is no way for the operator to determine the level of wear until the tire is worn. When the tire employs the tie-bar type wear indicator, since the wear indicator is the same color as the remaining part of the tread, it can be difficult to determine the level of wear.

U.S. Pat. No. 6,523,586 discloses wear indicators for a tire tread wherein, in a series, or predetermined closely located grouping, of related marks, the marks disappear as the tire is worn. While this provides continuous information to the consumer, the complexity of forming the tire is increased due to the need to form multiple different marks that appear only after a defined amount of wear.

SUMMARY OF THE INVENTION

The present invention is directed to a tire comprising at least one tread wear indicator. Each wear indicator is a single mark that provides continuous information to the consumer, while changing its presentation based upon the amount of tread wear. By forming only a single mark that continuously changes, the manufacturing of the tire is simplified while still providing the consumer with the needed information. Also disclosed is a mold blade used to form the single tread wear indicator. The blade has a changing configuration based upon the length of the mold blade.

Disclosed is a tire tread for a vehicle tire, the tread having at least one tread element projecting from the base of the tread and having an defined tread depth. At least one of the tread elements has a tread wear indicator. The wear indicator has a series of radially stacked portions, each portion having a configuration that visually indicates the tread depth and wherein each portion has a different configuration.

In one aspect of the disclosed invention, the radially innermost portion of the tread wear indicator is a warning symbol. The warning symbol may be any symbol that conveys the tread depth or a warning to the consumer regarding the tread depth.

In another aspect of the invention, the different configurations forming the different portions of the tread wear indicator are international picture symbols.

In another aspect of the disclosed invention, there is at least a single point of contact maintained between radially adjacent stacked portions of the tread wear indicator.

In another aspect of the invention, each portion of the tread wear indicator has a consistent configuration for the radial depth of each portion.

In another aspect of the invention, the tread wear indicator has at most five radially adjacent stacked portions.

Also disclosed is a molding device for forming a tread wear indicator in a tread. The molding device has a mold blade to form the tread wear indicator. The mold blade is formed from a series of stacked portions, each portion having a different configuration.

In one aspect of the invention, there is at least a single point of contact between the stacked portions of the mold blade so that the blade is a single molding element.

In another aspect of the invention, each portion of the mold blade has a constant configuration for the length of the portion.

In another aspect of the invention, the mold device has a tube surrounding the mold blade. The tube may have a constant or changing configuration; the shape of the tube acting to call attention to the configuration of the blade after the tread wear indicator has been formed. Additionally, if the cross sectional configuration of the tube changes, it changes at a location corresponding to a change in configuration of the mold blade.

DEFINITIONS

The following definitions are applicable to the present invention.

"Groove" means an elongated void area in a tread that may extend circumferentially or laterally about the tread in a straight curved, or zigzag manner. Circumferentially and laterally extending grooves sometimes have common portions and may be sub classified as "wide", "narrow", or "sipe". The slot typically is formed by steel blades inserted into a cast or machined mold or tread ring therefor. In the appended drawings, slots are illustrated by single lines because they are so narrow. A "sipe" is a groove having a width in the range from about 0.2% to 0.8% of the compensated tread width, whereas a "narrow groove" has a width in the range from about 0.8% to 3% of the compensated tread width and a "wide groove" has a width greater than 3% thereof. The "groove width" is equal to tread surface area occupied by a groove or groove portion, the width of which is in question, divided by the length of such groove or groove portion; thus, the groove width is its average width over its length. Grooves, as well as other voids, reduce the stiffness of tread regions in which they are located. Sipes often are used for this purpose, as are laterally extending narrow or wide grooves. Grooves may be of varying depths in a tire. The depth of a groove may vary around the circumference of the tread, or the depth of one groove may be constant but vary from the depth of another groove in the tire. If such narrow or wide groove are of substantially reduced depth as compared to wide circumferential grooves which they interconnect, they are regarded as forming "tie bars" tending to maintain a rib-like character in the tread region involved.

"Inner" means toward the inside of the tire and "outer" means toward its exterior.

"Outer" means toward the tire's exterior.

"Radial" and "radially" are used to mean directions radially toward or away from the axis of rotation of the tire.

"Tread" means a molded rubber component which, when bonded to a tire casing, includes that portion of the tire that comes into contact with the road when the tire is normally inflated and under normal load. The tread has a depth conventionally measured from the tread surface to the bottom of the deepest groove of the tire.

BRIEF DESCRIPTION OF THE DRAWINGS

The invention will be described by way of example and with reference to the accompanying drawings in which.

DETAILED DESCRIPTION OF THE INVENTION

Figure 1:
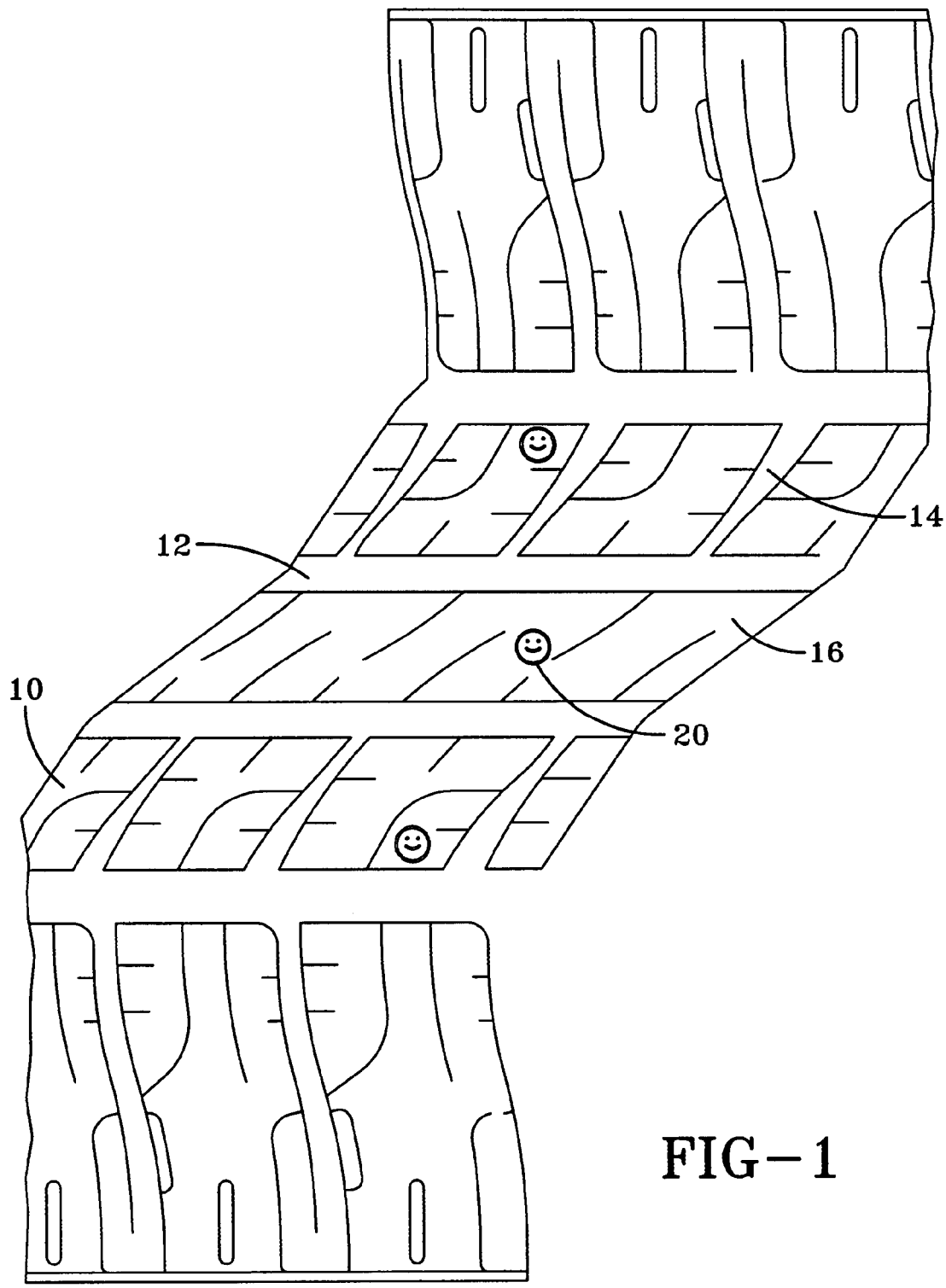
FIG. 1 is a portion of a tire tread.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each use the same reference numeral for similar components. The structures employed basically the same components with variations in location or quantity thereby giving rise to the alternative constructions in which the inventive concept can be practiced.

FIG. 1 illustrates a portion of a tire tread. The tread has a plurality of blocks 10 defined by circumferential and lateral grooves 12, 14 and a rib 16 located on the centerplane of the tire. The exact configuration of the tread is irrelevant to the present invention and any tread configuration may be employed.

Located in at least one of the tread elements, either a block 10 or the rib 16, is a single wear indicator 20. The wear indicator 20 is located in the tread in such a manner as to make contact with the road surface as the tire rotates, even when the tire is new and unworn. While the illustrated wear indicators 20 are present along an almost lateral line across the tread width, this is not required and the wear indicators 20 may be circumferentially spaced along the tire tread, i.e. it is not a requirement of the present invention to have a series, or predetermined closely located set, of the wear indicators.

Figure 2A:
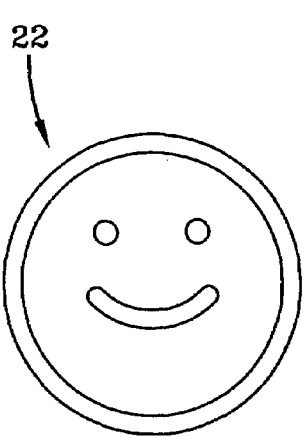
FIG. 2 illustrates the different portions of a tread wear indicator.
Figure 2B:
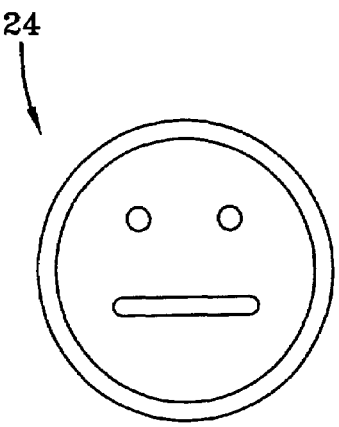
Figure 2C:
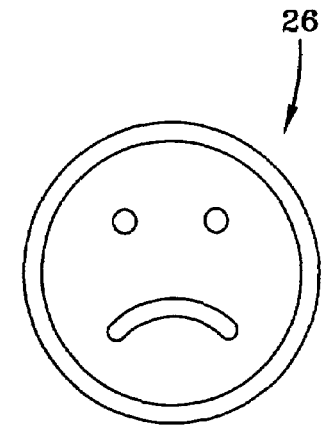
Figure 2D:
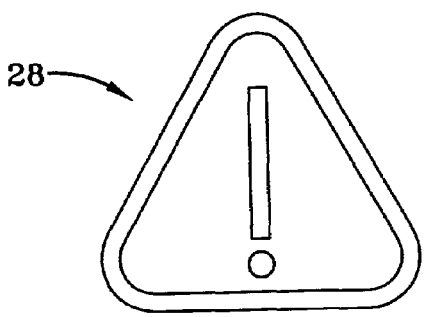
Figure 3:
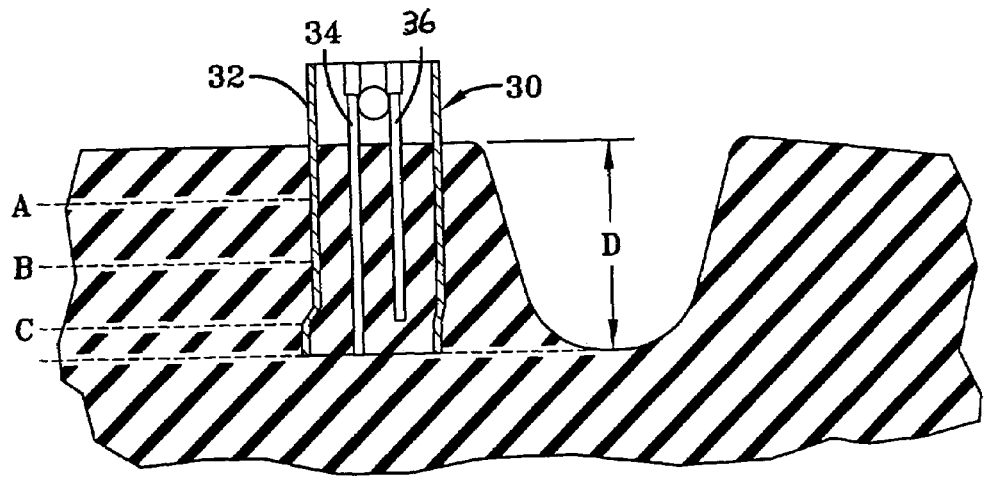
FIG. 3 is a cross sectional view of a tread and a tread wear indicator molding device.

When unworn, the wear indicator 20 has a configuration indicating that the tread depth is unworn. The configuration may be any type of configuration that readily communicates this to the consumer. A preferred configuration is the smiley face enclosed in a circle 22, see FIG. 2A. As the tread is worn, the configuration of the wear indicator 20 as seen by the consumer changes. After approximately one-third of the working tread depth, see line A in FIG. 3, is worn, the working tread depth being that which the appropriate governing authorities (such as NHTSA in the U.S.A.) deem to be appropriate or required for safety, the configuration changes from a smiley face 22 to a neutral face 24, see FIG. 2B. The neutral face 24 configuration is present until the working tread depth is worn approximately another third, line B of FIG. 3. At approximately two-thirds wear of the working tread depth, the neutral face 24 changes to a frowning face 26, see FIG. 2C. After the remaining third of the working tread depth is worn, line C of FIG. 3, and the tread level has reached the point considered unsafe by the appropriate governing authorities, the configuration again changes, from a frowning face 26 to a warning mark, such as the illustrated exclamation mark in a triangle 28, see FIGS. 2D and 3. The final configuration may be selected as any international picture mark recognized as a warning mark for consumers.

The predetermined wear levels at which the different configuration is visible may be selected at levels other those mentioned above. For example: the initial smiley face 22 may be present for less than a quarter of the initial useful life of the tread depth, the neutral face 24 may last for the next fifty percent of the initial useful life of the tread depth, and the frowning face 26 may last for the final quarter of the initial useful life of the tread depth.

Alternatively, the warning mark 28 may be selected to appear at a point wherein there is still tread remaining in the useful life of the tread depth D, so that the tire may still be considered to have sufficient tread life remaining to give the consumer time to replace the tire. One possibility is that the different configurations each last for one-fourth of the useful life of the tread depth D.

Figure 4A:
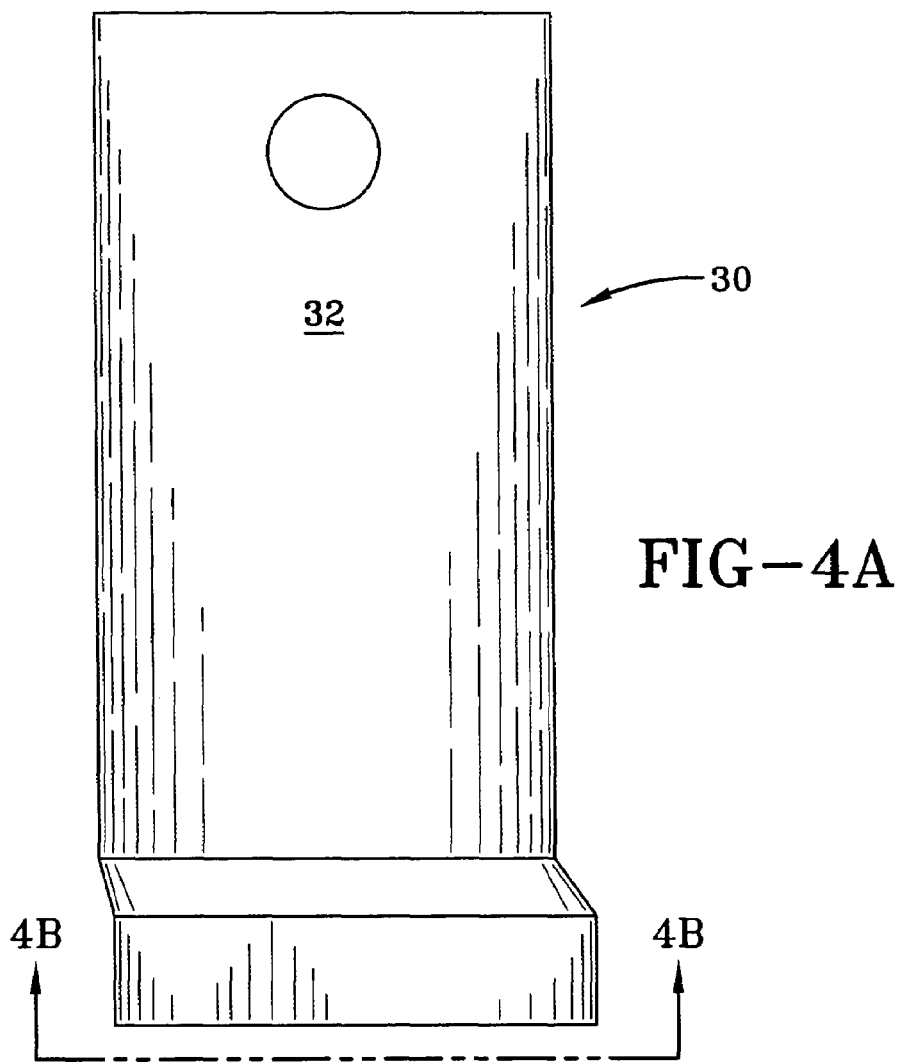
FIG. 4A is a side view of a molding device.
Figure 4B:
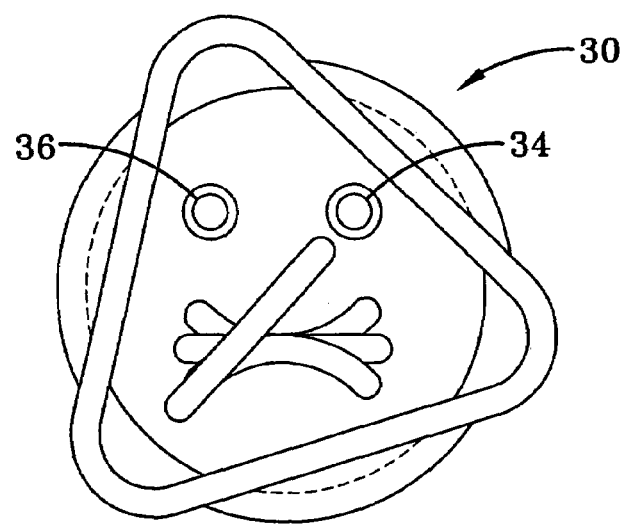
FIG. 4B is an end view of a molding device.
Figure 4C:
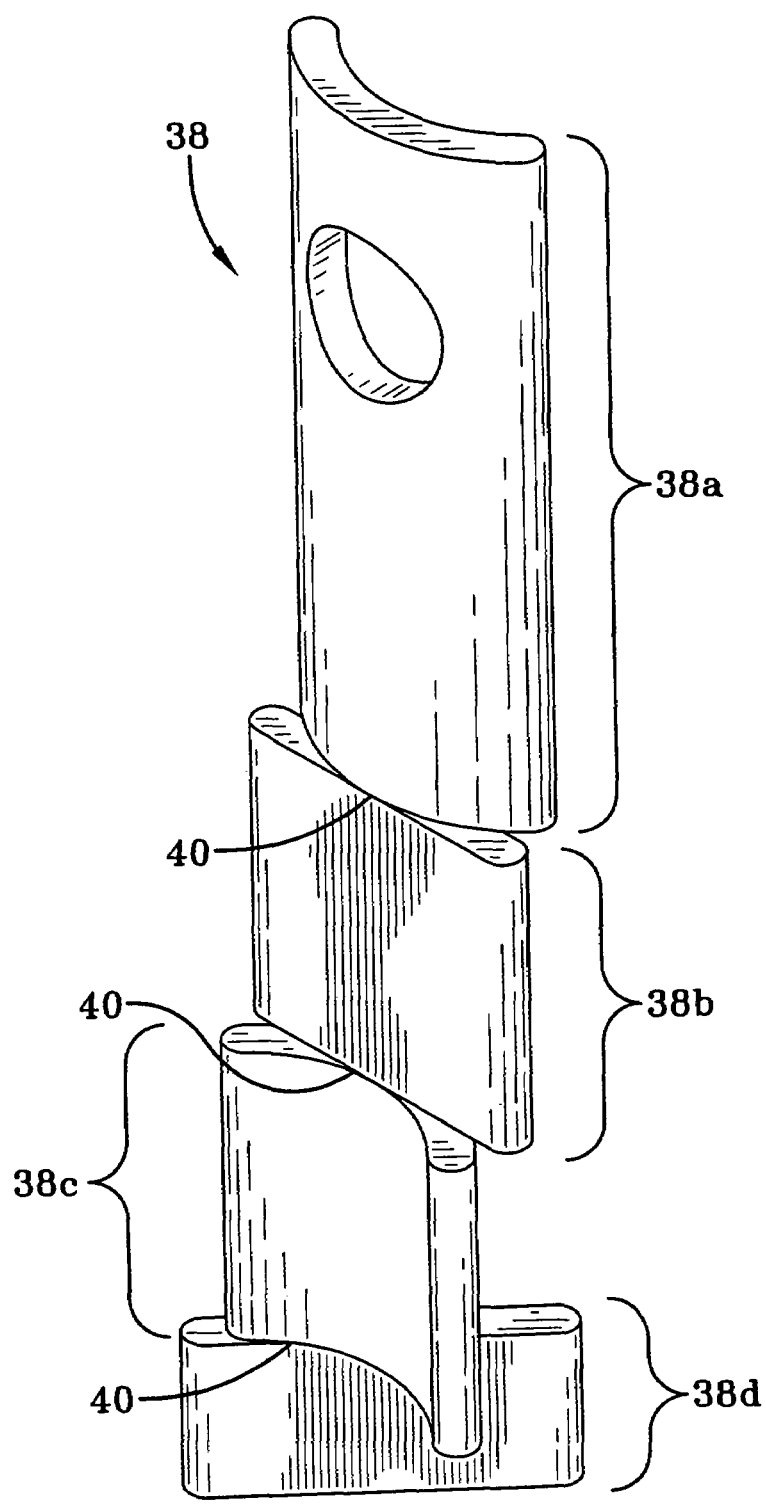
FIG. 4C is a perspective view of the blade of the molding device.

Since the different configurations appear consecutively as the tread is worn, for ease of manufacturing, the different symbols/configurations are formed in the tread by a single molding device 30, see FIGS. 4A-4C. The molding device 30 is formed from a tube 32 having internal pins 34, 36 and a blade 38. The molding device 30 is formed from conventional mold materials, such as steel, aluminum, or pressed metal.

The tube 32 forms the circle and triangular portions of the tread wear indicator 20. The majority of the tube 32 is circular, with one end having a triangular configuration to correspond to the triangular portion of the warning sign. The tube 32 has a length greater than the depth of the tread wear indicator as a portion of the tube 32 is used to secure the molding device 30 in the tread mold. Forming the two eyes of the different faces, and the point to the exclamation mark, are two pins 34, 36. The pin 34 which forms one eye and the exclamation mark point has a length greater than the other pin 36.

To form the changing mouth configuration of the faces 22, 24, 26 and the exclamation mark, a stacked blade 38 is located inside the tube 32. The first portion 38a of the blade 38 is curved to form the smiling mouth, the next portion 38b is straight to form the neutral mouth, the third portion 38c is curved to form the frowning mouth, and the remaining portion 38d is straight to form the exclamation mark. A point of contact 40 is maintained between adjacent portions 38a, 38b, 38c, 38d so that a single blade 38 results.

When assembled, the stacked blade 38 and pins 34, 36 are located inside the tube 32, and the tube 32 is mounted to the inside of the tread mold.

Because of the changing configuration of the molding device 30 and the blade 38 therein, samples were made using a tread compound block and a sample molding device 30. To simulate the worst case for rubber extraction, a summer compound (i.e. a stiffer compound) was used was testing. The samples tested fine, showing the different configurations at the preset tread depths. The molding device 38 was formed with a thickness equivalent to a conventional sipe blade.

Figure 5:
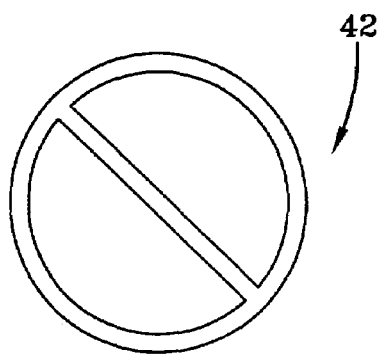
FIG. 5 is an alternative configuration for a portion of the wear indicator.

As noted above, other international symbols may be used to designate the different wear levels of the tread. FIG. 5 shows the circular crossed symbol 42; known as the symbol for "no" or a non-permitted activity. When using this symbol 42 as the final warning symbol in the tread wear indicator, the tube 32 of the molding device 30 would remain a circular tube for its entire length. Alternatively, a simple warning triangle may be used instead of the frowning face 26 to indicate a warning, with the final configuration including the emphasis of the exclamation mark within the triangle.

Alternatively, the stacked blade 38 may be used to create a stack of numbers indicating the tread wear level. The main requirement in forming the molding device is that there be at least one point of contact 40 between the different configurations, or blade portions, so that the molding device 30 can be readily inserted into and extracted from the tread rubber. This does require the selected numbers, or other indicators, be as simple in configuration as possible and precludes having numerous, preferably not more than 5 different, configurations forming the stacked blade 38. Also, the stacked blade 38 may be used without an external tube 32; the presence of the circle and the triangle merely assist in calling attention to the tread wear indicator.

The present invention is directed towards a tread wear indicator that provides for a changing configuration in the tread wear indicator based on the tread wear. The disclosed indicator provides for continuous and progressive indication of the tread wear. When formed in the preferred method of using a stacked blade, the complexity in forming the mold and the molding of the tire is significantly reduced to conventional series of tread wear indicators that provide progressive indication of the tread wear.

What is claimed is:

1. A molding device for forming a tread wear indicator in a tread, the molding device comprising a mold blade, the mold blade being characterized by a series of stacked portions, each portion having a different configuration, the molding device further comprising a pair of pins, the pins being adjacent to the mold blade, wherein the one pin has a greater length than the other pin.

2. A molding device for forming a tread wear indicator in a tread, the molding device comprising a mold blade, the mold blade being characterized by a series of stacked portions, each portion having a different configuration, the molding device further comprising a tube surrounding the mold blade.

3. The molding device of claim 2 wherein for at least a portion of its length, the tube has a circular configuration.

4. The molding device of claim 2 wherein the tube has a changing cross sectional configuration.

5. The molding device of claim 2 wherein the tube has a cross sectional configuration that changes at a location corresponding to a change in configuration of the mold blade.

* * * * *